(12) United States Patent
Grundy et al.

(10) Patent No.: US 7,111,108 B2
(45) Date of Patent: Sep. 19, 2006

(54) MEMORY SYSTEM HAVING A MULTIPLEXED HIGH-SPEED CHANNEL

(75) Inventors: Kevin P. Grundy, Fremont, CA (US); Para K. Segaram, Cupertino, CA (US)

(73) Assignee: Silicon Pipe, Inc., San Jose, CA (US)

( * ) Notice: Subject to any disclaimer, the term of this patent is extended or adjusted under 35 U.S.C. 154(b) by 0 days.

(21) Appl. No.: 10/823,499

(22) Filed: Apr. 12, 2004

(65) Prior Publication Data

US 2004/0236894 A1 Nov. 25, 2004

Related U.S. Application Data

(60) Provisional application No. 60/513,527, filed on Oct. 21, 2003, provisional application No. 60/462,454, filed on Apr. 10, 2003.

(51) Int. Cl.
*G06F 12/00* (2006.01)

(52) U.S. Cl. ............... 711/100; 710/305; 370/431; 370/538

(58) Field of Classification Search .............. 711/1, 711/100, 167; 710/305, 307; 386/111; 370/431, 370/538, 410, 468
See application file for complete search history.

(56) References Cited

U.S. PATENT DOCUMENTS

| | | | |
|---|---|---|---|
| 5,515,368 A * | 5/1996 | Saito et al. ............... | 370/428 |
| 5,715,274 A | 2/1998 | Rostoker et al. | |
| 5,745,491 A * | 4/1998 | Ando et al. ............... | 370/428 |
| 5,860,080 A | 1/1999 | James et al. | |
| 5,945,886 A | 8/1999 | Millar | |
| 6,125,419 A | 9/2000 | Umemura et al. | |
| 6,160,823 A * | 12/2000 | Saintot .................... | 370/538 |
| 6,304,450 B1 | 10/2001 | Dibene, II et al. | |
| 6,833,984 B1 * | 12/2004 | Belgacem ................ | 361/58 |
| 2002/0067915 A1 * | 6/2002 | Shida et al. ............ | 386/111 |
| 2002/0083255 A1 * | 6/2002 | Greeff et al. ............ | 710/305 |
| 2002/0159467 A1 * | 10/2002 | Kirshenboim et al. ..... | 370/410 |

FOREIGN PATENT DOCUMENTS

WO WO 02/17549 A2 * 2/2002

OTHER PUBLICATIONS

IEEE Computer Society, *IEEE Standard for High-Bandwidth Memory Interface Based on Scalable Coherent Interface (SCI) Signaling Technology (RamLink)*, IEEE Std 1596.4-1996, Mar. 19, 1996, pp. i-91.
Przybylski, Steven A., *New DRAM Technologies*, MicroDesign Resources, 1994, pp. 204-215.
Poulton, John, *Signaling in High-Performance Memory Systems*, ISSCC 1999, pp. 1-59.
*Serial Network SDRAM* presentation, ENEE 759H, Spring 2003, pp. 1-30.

* cited by examiner

*Primary Examiner*—Pierre-Michel Bataille
(74) *Attorney, Agent, or Firm*—Shemwell Mahamedi LLP

(57) ABSTRACT

A memory system having a memory controller, interface device and plurality of memory elements. The interface device is coupled to the memory controller via a first high-speed signal path. The plurality of memory elements are removably coupled to the interface device via respective second signal paths, each of the second signal paths having a lower signaling bandwidth than the first signaling path.

27 Claims, 14 Drawing Sheets

| High-Speed Point-to-Point Channel Signals | Type | S or D | Pin Quan | DRAM Signals | Type | S or D | Pin Quan |
|---|---|---|---|---|---|---|---|
| Channel DATA | I/O | Dif | 20 | DRAM DATA | I/O | Sing | 80 |
| Channel CLK | I | Dif | 2 | DRAM CLOCK | O | Dif | 8 |
| Channel DESKEW CLK | O | Dif | 2 | DRAM REF CLK | O | Sin | 2 |
| Channel DRAM CLK | I | Dif | 2 | DRAM PLL CLK | I | Dif | 2 |
| Channel DIRECTION | I | Dif | 2 | DRAM STROBE | I/O | Sing | 12 |
| Channel STROBE ENABLE | I | Dif | 2 | | | Dif | |
| Channel CONTROL BUS | I | Dif | 4 | DRAM CONTROL | O | Sing | 8 |
| Channel Rev STROBE ENABLE | O | Dif | 2 | DRAM ADDRESS | O | Sing | 8 |
| | | Total | 36 | | | Total | 120 |

FIGURE 20

MEMORY SYSTEM HAVING A MULTIPLEXED HIGH-SPEED CHANNEL

CROSS-REFERENCE TO RELATED APPLICATIONS

This application claims priority from U.S. Provisional Application No. 60/462,454 filed Apr. 10, 2003 and U.S. Provisional Application No. 60/513,527 filed Oct. 21, 2003, each of which is hereby incorporated by reference in its entirety.

FIELD OF THE INVENTION

The present invention relates to the field of high-speed electronic memory systems.

BACKGROUND

The inexorable increase of CPU speed during the past two decades has pushed memory systems into faster and wider implementations. It is clear that increased CPU clocking speed alone cannot provide for quicker software execution times. Memory systems should be designed to deliver data to the CPUs at their native rates or risk forfeiting the benefit of the CPU's increased performance capabilities.

There are two fundamental system approaches to increasing memory system performance. First, increasing the internal access speed of memories has been an ongoing activity for the past decade, particularly in regard to dynamic random access memories (DRAMs), the memory technology most often used to implement the main operating storage in computers and other consumer electronics devices. Second, increasing the width of the data bus to the memory system also provides extra bandwidth.

In today's environment, both approaches of increasing DRAM speed and bus widths are being implemented. The Double-Data-Rate 2 (DDR-2) specification, for example, is a follow-on specification to DDR-1 and provides for data delivery rates up to 800 megabits per second (Mb/s) per pin. DDR-2 is projected to double the performance of memory systems and imposes modest modifications to both the DRAMs and the DRAM controllers. Alternatively, some system designers have resorted to dual memory controllers to double the bandwidth, as in the prior-art system of FIG. 1. With multiple controllers, each can operate independently thereby providing additional bandwidth. However, the use of multiple controllers, while allowing for higher bandwidth, also requires many more I/O signals and PCB board space.

FIG. 2 illustrates a prior-art multi-drop memory system that is prevalent in modern processing systems In essence, memory elements are tied into a common bus which terminates at a memory controller. The signal routing allows for stubs, or signal paths which are tapped off from the main signal path. These stubs make it very convenient to design and implement removable memory modules such as single inline memory modules (SIMMs) or dual inline memory modules (DIMMs). However these stubs also create signal transmission problems especially at higher frequencies. In fact, as frequencies have progressed into the multiple of 100s of Megahertz, the signal degradations become very pronounced due to these stubs.

In modern multi-drop memory systems, the length of stubs are reduced to minimal proportions and enhanced I/O (input/output) electronics are provided in both the controller and the memory elements to achieve higher signal frequencies. FIG. 3, for example, illustrates a prior-art memory system that includes sophisticated timing and control circuitry in both the memory controller and DIMM-mounted memory devices. As shown, a CPU 20, connects to a memory controller 22 via a front side bus 21 (i.e., having address and data paths as shown). The memory controller 22 contains a data channel, an address decoder and multiplexer as well as generators for clocks and memory timing. The resulting memory interface signals 23, 24 and 25 connect to DRAM chips on DIMM modules 26 via electrical paths typically routed through printed circuit board traces, DIMM sockets and DIMM PCB substrates. In this implementation, signals 23, 24, 25 generated/received by the memory controller 22 are directly connected to individual memory chips. In order to boost signaling rates and thereby achieve higher memory bandwidth, relatively complex timing circuits (e.g., delay locked loops) are typically provided in both the memory controller and each of the memory chips to recover timing information from source-synchronous strobe signals (e.g., BYTE Strobe). Even with such timing circuitry and the cost penalty they impose, multiple instances of the memory controller and DIMMs are often required to satisfy bandwidth requirements of modern data processing applications.

FIG. 4 illustrates a view of a prior-art memory system showing a memory controller, a channel and a memory element. For most systems utilizing a memory system, such as a desktop computer, the distance between the controller and the memory is kept to a minimum thereby allowing for the least amount of signal distortion on the signal channel. For a typical desktop computer, this distance ranges between 6 and 8 inches. For earlier computer systems (circa the early 1990s), where the frequency of signals was less than 100 MHz, primitive signal path structures (vias, through-hole connectors and single ended transmission) did not seriously degrade the communication between the controller and memory. The memory controller and memory elements could utilized straight-forward and simple I/O drivers. As semiconductor improvements became available, it was possible to increase both the density and speed of both the controller and memory elements, shifting the performance bottleneck to the interconnecting channel. That is, as illustrated in FIG. 5, the physical channel that allowed signal transmission with simple I/O in the hundred megahertz range exhibits relatively poor high-frequency response (e.g., due to the more pronounced effects of capacitance, inductance, loss, impedance mismatch, etc.) and therefore became inadequate as on-chip frequencies entered the gigahertz range. Consequently, taking advantage of the added transistors made available by shrinking process technologies, engineers designed more sophisticated I/O drivers and receivers. These I/O cells, in the form of SERDES (SERializers/DESerializers), Clock Data Recovery (CDRs) circuits, pre-emphasizers, encoders, deskewers, and so forth have made it possible to push the speed of signaling up into the Gigahertz range and still utilize conventional channel structures. Unfortunately, such sophisticated I/O cells add significant design and manufacturing expense and therefore drive up system cost. Such I/O cells also tend to consume substantial additional power, reducing thermal overhead within the memory devices and controller and driving up operational cost.

Another problem facing designers of modern memory systems is that the reduced supply voltages necessitated by shrinking process technologies are increasingly insufficient to drive signals across the lossy channel. That is, due to the losses incurred in the channel at higher frequencies, I/O drivers have been forced to stay at higher voltages (and therefore slower speeds) in order to maintain signal margins.

Designers of memory system components are increasingly faced with this dilemma of difference between the voltage needs of the internal core logic in a semiconductor versus the more demanding voltage requirements of I/O circuitry.

BRIEF DESCRIPTION OF THE DRAWINGS

The present invention is illustrated by way of example, and not by way of limitation, in the figures of the accompanying drawings and in which like reference numerals refer to similar elements and in which:

FIG. 20 illustrates an example table of high-speed point-to-point channel signals.

DETAILED DESCRIPTION

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. The term "terminal" is used to mean a point of electrical connection. The term "exemplary" is used to express but an example, and not a preference or requirement.

Figure 6:
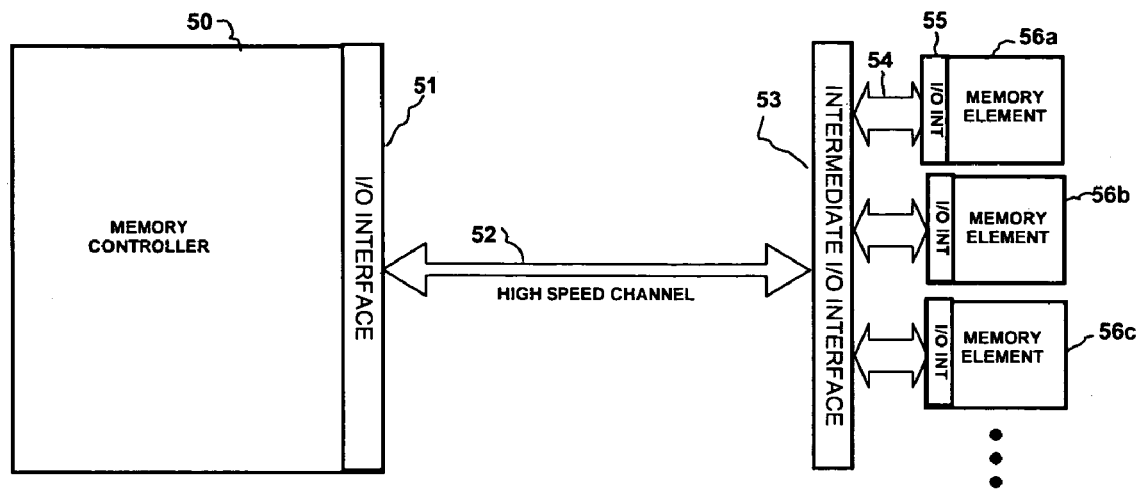
FIG. 6 illustrates an embodiment of the invention with very high speed I/O interface an a clean channel separate from the memory elements.

FIG. 6 illustrates a memory system according to an embodiment of the invention. A memory controller 50, with an integrated high-speed I/O interface 51, connects to a high-speed point-to-point channel 52. The high-speed point-to-point channel 52, instead of terminating at a memory elements 56a–56c, terminates instead to an intermediate I/O interface 53. The high-speed point-to-point channel 52 is point-to-point with no significant signal stubs. The intermediate I/O interface 53 is also connected to memory elements 56a–56c through signal paths 54 which can run at substantially lower frequency than the high-speed point-to-point channel 52. The intermediate I/O interface 53 is an active interface and contains digital or analog circuitry providing for connectivity between both sides of the I/O interface 53. By this arrangement, the high-speed channel 52 and its active or passive termination circuitry (which may be located within or external to the integrated circuit device and at both or either ends of the high-speed channel 52) is isolated from the I/O interface 55 contained within the memory elements 56a–56c, effectively segmenting the overall signal path between memory controller 50 and memory elements 56 into two, different-performance channels 52, 54 and intermediate interface 53. Consequently, instead of burdening each memory element 56a, 56b, 56c with sophisticated electronics to mitigate the harmful effects of sending a signal through a channel from the memory controller 50, each memory element 56 can be manufactured with less sophisticated I/O circuitry 55. For example, because dedicated I/O channels 54 are provided for the memory elements 56a, 56b, the I/O drivers 55 within memory elements 56 are not required to drive high speed signals through challenging channel imperfections and therefore may be implemented by relatively inexpensive, low power I/O circuits. The resulting cost and power savings is multiplied by the number of memory elements 56 present in the memory system (which may be many dozens of devices, or more) and therefore represents a significant benefit over solutions that necessitate sophisticated I/O circuitry.

Also, the high-speed point-to-point channel 52, and its terminating interfaces 51, 53 can be optimized for very high speed operation in a cost-effective manner since this point-to-point connection remains fixed as part of the memory system, in contrast to the memory devices 56 which may be inserted and removed as necessary to achieve a desired storage capacity. For example, in one embodiment, the high-speed channel 52 is formed by a plurality of differential signal lines that extend parallel to one another in a point-to-point path between the memory controller 50 and I/O interface 53. Due to absence of stubs and other significant sources of signal distortion and because of the substantially equal electrical lengths of individual signal lines within the high-speed channel 52, signals arrive at their destination (i.e., either the I/O interface 53 or memory controller 50) with extremely low timing skew (e.g., less than 5% of the data valid interval) and relatively low levels of distortion. Because of the low-distortion channel 52 and optional clock-data recovery (CDR), no signal encoding is necessary (i.e., in contrast to systems that require encoding for error detection purposes or to ensure sufficient transition density for CDR operation). Also, because a clock or strobe signal may be transmitted at full frequency over the channel with negligible skew, no phase-locked loop (PLL) is required to regenerate a sampling clock signal within the I/O interface 53 (although a PLL or delay-locked loop (DLL) may nonetheless be provided). As the high-speed channel 52 is used to interconnect integrated circuit devices, any number of different interconnection techniques and signal path structures may be used to establish the high-speed channel 52 (or any other high-speed or lower-speed channels disclosed herein) including, without limitation, interconnection techniques and signaling paths disclosed in U.S. patent application Ser. No. 10/426,930 filed Apr. 29, 2003 and entitled "Direct-Connect Signaling System." U.S. patent application Ser. No. 10/426,930 is hereby incorporated by reference in its entirety.

Figure 1:
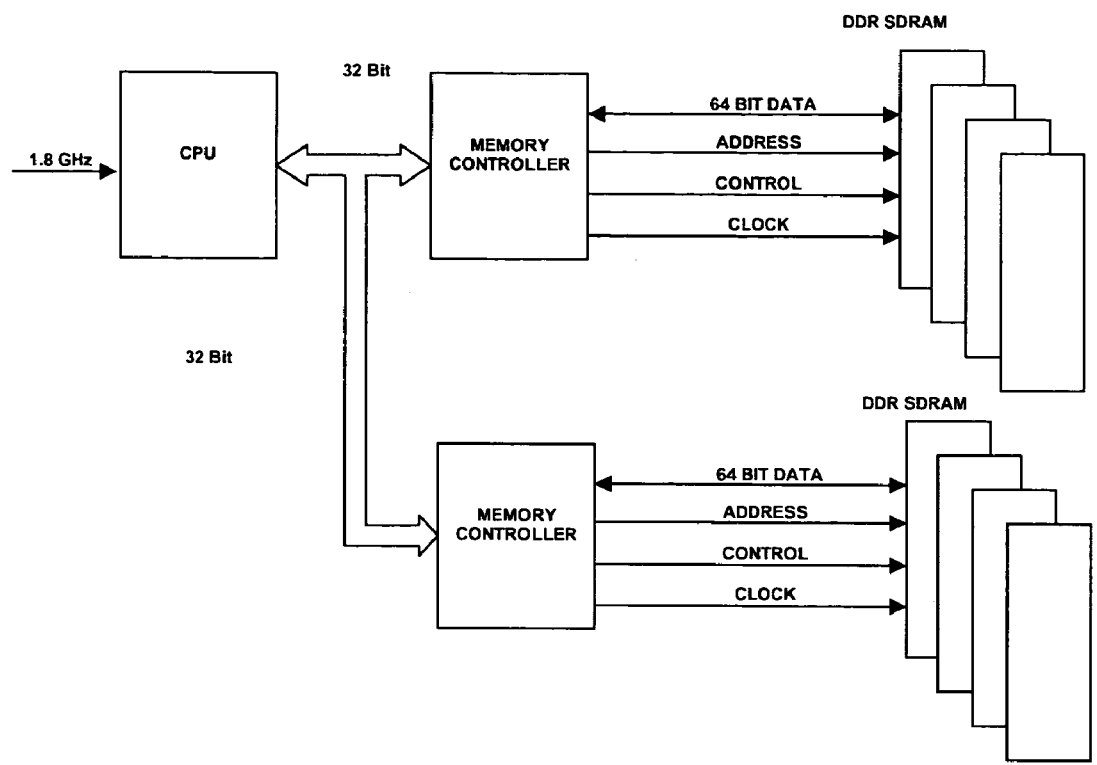
FIG. 1 illustrates a prior-art CPU and Dual Memory Controller.
Figure 2:
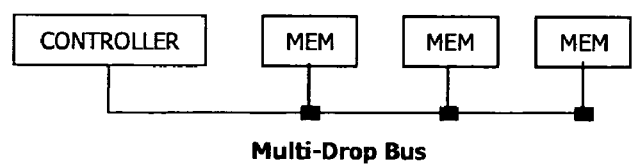
FIG. 2 illustrates a prior-art multi-drop memory system topology.

Another benefit of segmenting the signal path between controller 50 and memory elements 56 into a high-speed channel 52, intermediate interface 53 and lower-speed signal paths 54 is to enable placement of the array of memory elements 56a, 56b, 56c further away from the memory controller 50 than might be otherwise possible. That is, because many of the imperfections that plague the prior-art channel between the memory controller and memory elements (e.g., the stubs associated with the multi-drop system of FIG. 2) are avoided in the high-performance channel 52 and interfaces 51 and 53, the channel 52 may be made significantly longer to permit more convenient location of memory devices 56. Also, as discussed below, in contrast to the trace-on-circuit-board channel implementations used in prior-art memory systems, the high-performance channel 52 may be implemented by one or more flex cables, coaxial cables and various other types of flexible interconnection structures, and therefore enable memory devices 56 to be disposed virtually anywhere in a three-dimensional space within the system (e.g., adjacent a system housing to permit access via a hatch, door or other opening).

The memory controller 50 may be constructed monolithically, as in a single integrated circuit (IC) device, or alternatively as separate components, such as several IC devices. The high speed point-to-point channel 52 may be constructed from, but is not limited to flex conductors, coaxial wires, twin-axial wires or printed circuit board traces. The high-speed point-to-point channel 52 may be implemented as a single bi-directional signal path to enable data transmission to and from the memory controller 50 either sequentially or simultaneously (i.e., half-duplex or full-duplex). Alternatively, the high-speed point-to-point channel 52 may be implemented as multiple independent signal paths which act dependently or independently (e.g., two uni-directional signal paths for transmission from controller 50 to intermediate interface 53 and vice-versa). Also, the high-speed point-to-point channel 52 may include dedicated or shared signal lines to carry signaling control signals (e.g., strobe signal, clock signal, direction control signal, etc.) In one embodiment, the intermediate I/O interface 53 is implemented in a single discrete IC device (i.e., separate from IC devices used to implement the memory controller 50 and memory elements 56). Alternatively, the intermediate I/O interface 53 may be implemented by multiple IC devices or multiple assemblies having IC devices thereon. Memory elements 56a, 56b, 56c may be implemented within a single IC device (i.e., monolithic), or may be formed in separate IC devices. Also, the different memory elements 56a, 56b, 56c may each include the same type of storage technology (e.g., all DRAM, SRAM, flash EEPROM, etc.), or different storage technologies. Further, each of the memory elements 56a, 56b, 56c, or any one of them, may include multiple integrated circuit devices as, for example, in a dual inline memory module (DIMM), single inline memory module (SIMM) or the like.

Figure 7:
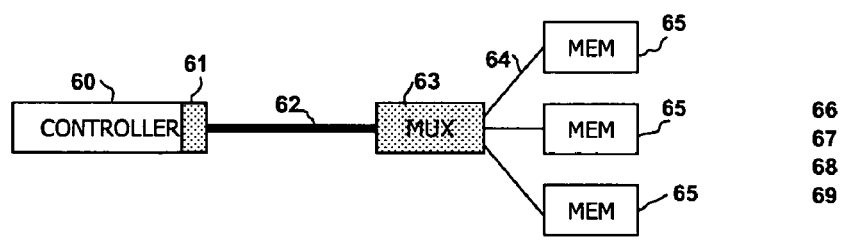
FIG. 7 illustrates an embodiment of the invention with a very high speed I/O interface and a clean channel coupled to a single multiplexer/demultiplexer.

FIG. 7 illustrates a memory system according to an embodiment of the invention. A memory controller 60 having I/O interface 61 is coupled (via high speed point-to-point channel 62) to an intermediate I/O interface device in the form of a Multiplexer/Demultiplexer (MUX) 63. The MUX 63 in turn, is coupled to memory elements 65 via lower-speed channels 64. The I/O interface 61 and MUX 63 perform inverse multiplexing and demultiplexing functions. More specifically, data received within the controller from a host device (e.g., a CPU, DMA controller, application-specific IC (ASIC), etc.) is multiplexed onto high-speed channel 62 by I/O interface 61, then received and demultiplexed within MUX 63 before being transmitted in respective data subsets to the memory elements 65. Conversely, data output from the memory elements 65 to the MUX 63 (e.g., read data, status information, etc.) is multiplexed onto the high-speed channel 62, then received and demultiplexed within I/O interface 61 before being transmitted to the data requestor. The memory elements can be virtually any type of volatile memory (e.g., static random access memory (SRAM) and dynamic RAM (DRAM) of various types) or non-volatile memory (e.g., battery-backed SRAM or DRAM, electrically-erasable programmable read only memory (EEPROM) such as flash EEPROM, and other types of non-volatile storage such as ferroelectric RAM and so forth).

Figure 8:
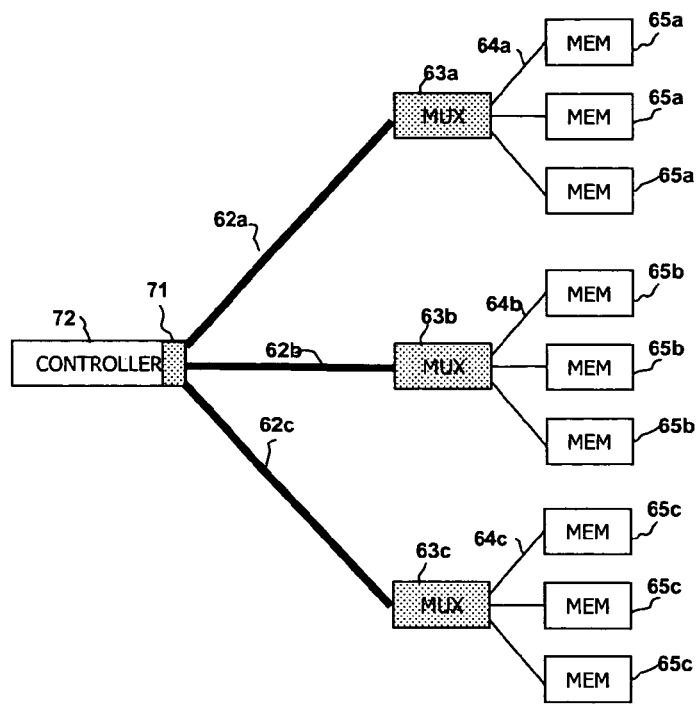
FIG. 8 illustrates an embodiment of the invention with multiple very high speed I/O interfaces and multiple clean channels coupled to multiple multiplexer/demultiplexers.

In one embodiment, the high-speed point-to-point channel 62 is designed to support an aggregate bandwidth equal to or greater than the sum of the peak bandwidths of the individual memory elements 65. Similarly, the MUX 63 provides the necessary time domain and/or frequency domain signal multiplexing to enable the memory controller to simultaneously access each of the memory elements 65 at their respective peak bandwidths (which may be the same or different). A key benefit to this approach is that, as each additional memory element 65 is coupled to the memory system, not only is the total storage capacity of the system increased, but the memory bandwidth itself is increased by the peak bandwidth of the added memory element. The MUX 63 connects to memory elements 65 via signal channels 64. While the high-speed point-to-point channel 62 has only two terminations, signal channels 64 connecting the memory elements 65 may be constructed using multi-drop busing, thus allowing additional memory to be added without the corresponding addition of memory system bandwidth. Also, as shown in FIG. 8, the interface 61 may be modified to include circuitry to support multiple high-speed point-to-point interfaces, thus providing a memory controller 72 and interface 71 that allows system expansion through addition of memory subsystems that include a high-speed channel 62, MUX 63 and memory devices 65 coupled thereto (i.e., adding high-speed channels 62*b*, 62*c*, MUXes 63*b*, 63*c*, lower-speed channel sets 64*b*, 64*c* and memory device sets 65*b*, 65*c*).

Figure 3:
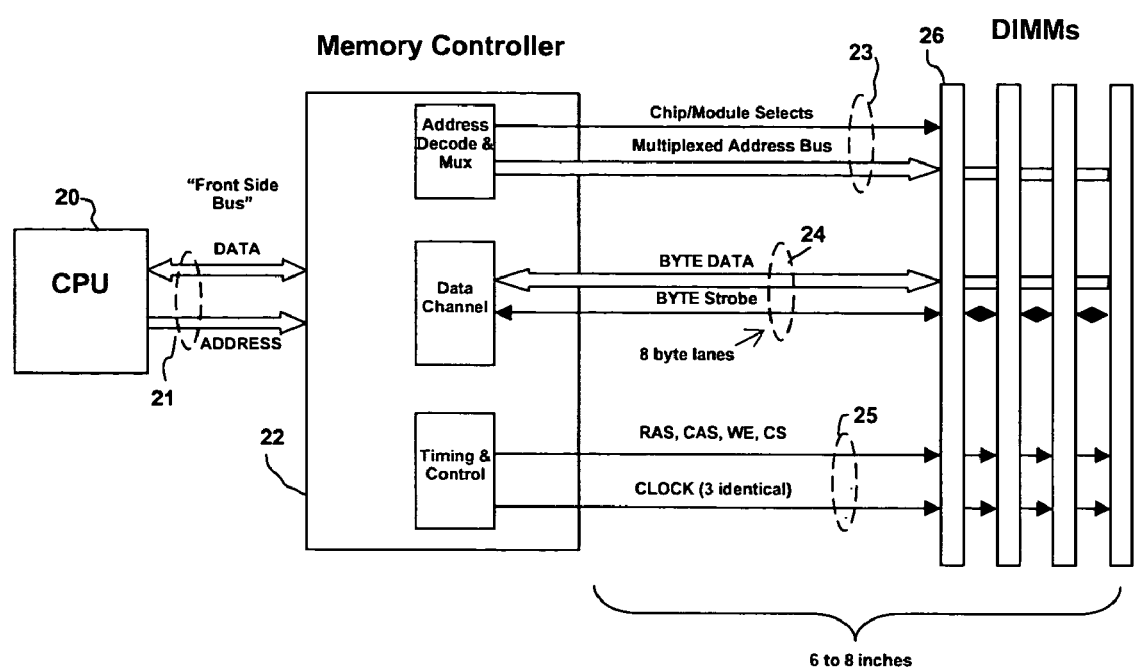
FIG. 3 illustrates a prior-art DIMM-based memory system.
Figure 4:
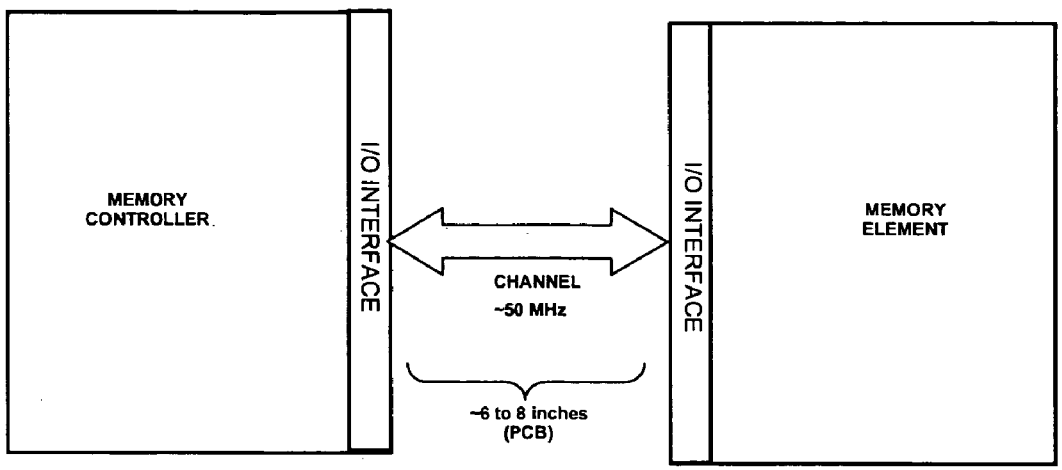
FIG. 4 illustrates a block diagram of a prior-art low speed memory system.
Figure 5:
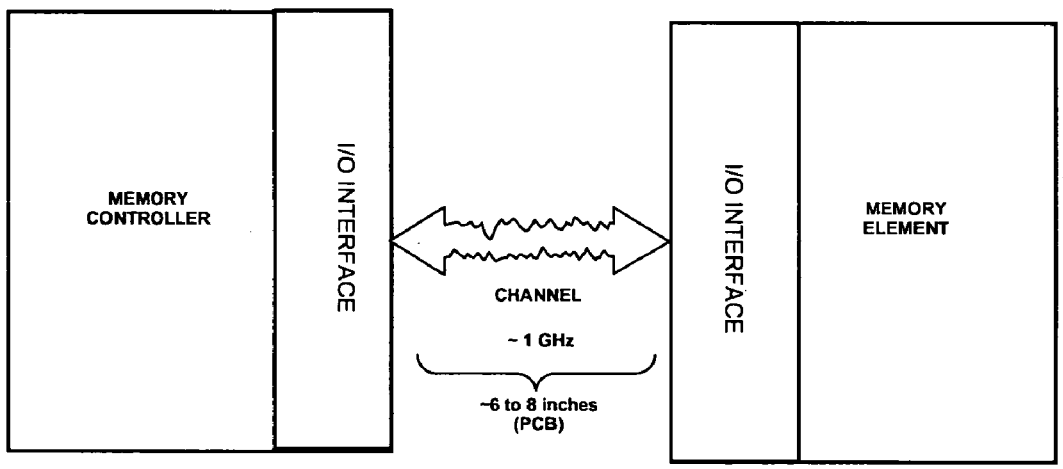
FIG. 5 illustrates a block diagram of a higher speed prior-art memory system.
Figure 9:
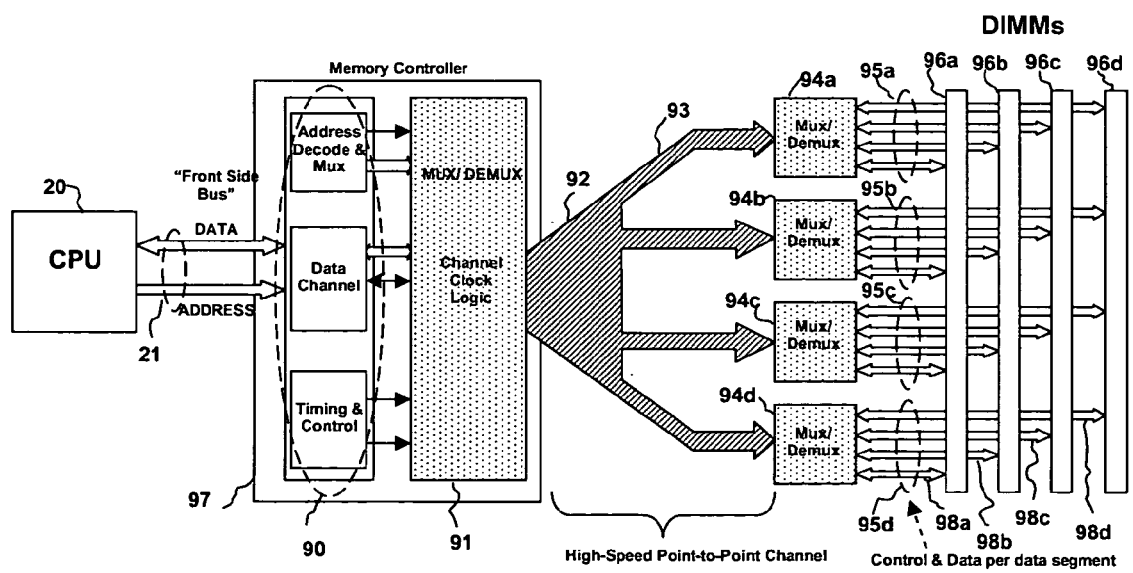
FIG. 9 illustrates an embodiment of the invention utilizing DDR memory controller and DDR DIMMs.
Figure 12:
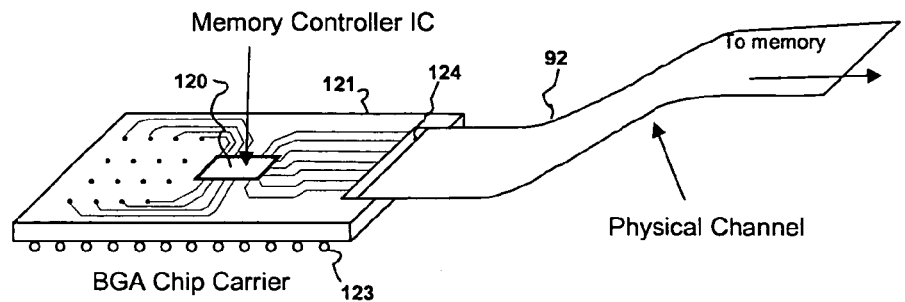
FIG. 12 illustrates an example of a clean physical channel.

Applying the embodiment of the invention shown in FIG. 7, an implementation of a memory system utilizing a modified version of a conventional memory controller and conventional DIMMs is illustrated in FIG. 9. The CPU 20 and CPU interface to the memory controller (i.e., front side bus 21) is unchanged from the prior-art system shown in FIG. 3. However, as part of the memory controller 97, a high speed multiplexer/demultiplexer 91 with high-speed I/O drivers and channel interface is added. The signals generated by the logic blocks 90 within the memory controller 97 are multiplexed by the high speed multiplexer/demultiplexer 91 and sent over a high-speed point-to-point channel 92, 93 that terminates in mux/demux circuits 94*a*–94*d*. The mux/demux circuits 94*a*–94*d* demultiplex the multiplexed signals received via the channel 92, 93 into respective subsets of signals that are output respectively to DIMMS 96*a*–96*d*. Signals 95*a*, 95*b*, 95*c*, 95*d* exiting the mux/demux blocks 94 are the reconstructed versions of the signals generated by the memory controller logic block 90. Using this approach it is possible to implement the circuitry for the mux/demux blocks 91, 94 to be simple and low cost as well as very high speed. The high-speed point-to-point channel shown in FIG. 9 is shown as being constructed as a single unit with two separate sections. This construction form is typical for flex type interconnects. Sections 93 provide independent connectivity to mux/demux blocks 94, which are typically implemented as inexpensive semiconductors. This allows each individual mux/demux block to be optimally placed physically near the DIMM array so as to reduce signal skew issues on the signal sets 95 going to the DIMMs. Section 93 is an amalgamation of the separate section 93 and provides for a single attach point to the memory controller 97. Separate attach points may be used in alternative embodiments FIG. 12 illustrates an embodiment of one end of the high-speed point-to-point channel implemented using a flex circuit. In the figure is shown a ball grid array (BGA) chip carrier 121 having a central memory controller IC 120. Terminations for the BGA are provided on upper and lower surface. The lower surface is provided with solder balls 123 for termination and signal traces on the upper surface are terminated by means of a connector 124. Signals are transmitted to and from the memory devices on a controlled impedance physical channel, such as a flexible circuit 92. The separate channel sections 93 may be kept separate and attach separately onto the memory controller 97 as well. The signal sets 95 shown in FIG. 9 are organized to facilitate high-speed connections into the DIM array. The DIMMs shown in FIG. 9 are 64 bit (though different size DIMMs or SIMMs, discrete memory components, etc. may be used in alternative embodiments). Therefore, in this implementation, each mux/demux 94 handles 16 bits of data. For example, Mux/demux 94*a* handles bits 0–15, mux/demux 94*b* handles bits 16–31, etc. Each mux/demux 94*a*, 94*b*, 94*c*, 94*d* is coupled via separate data paths 98*a*, 98*b*, 98*c*, 98*d* to DIMMs 96*a*, 96*b*, 96*c*, 96*d*, respectively. With separate data paths, it is possible for each DIMM to act independently so that, as each additional DIMM is inserted, additional memory bandwidth is achieved in the memory system, thus providing a substantial benefit. In typical DIMM arrays, the addition of another DIMM supplies only additional memory storage, not additional memory bandwidth. With the present invention, the addition of DIMMs not only provides additional storage but additional memory bandwidth. The mux/demux blocks 91, 94 along with the high-speed point-to-point channel 92, 93, can be designed to handle the worst case bandwidth load when all DIMMs are installed. For example, if each DIMM provides 800 megabytes/second of bandwidth, then the mux/demux blocks 91, 94 and high-speed point-to-point channel 92, 93 implementation may be designed to support 3.2 Gigabyte/second bandwidth. Higher and lower bandwidths may be supported in alternative embodiments.

Figure 11:
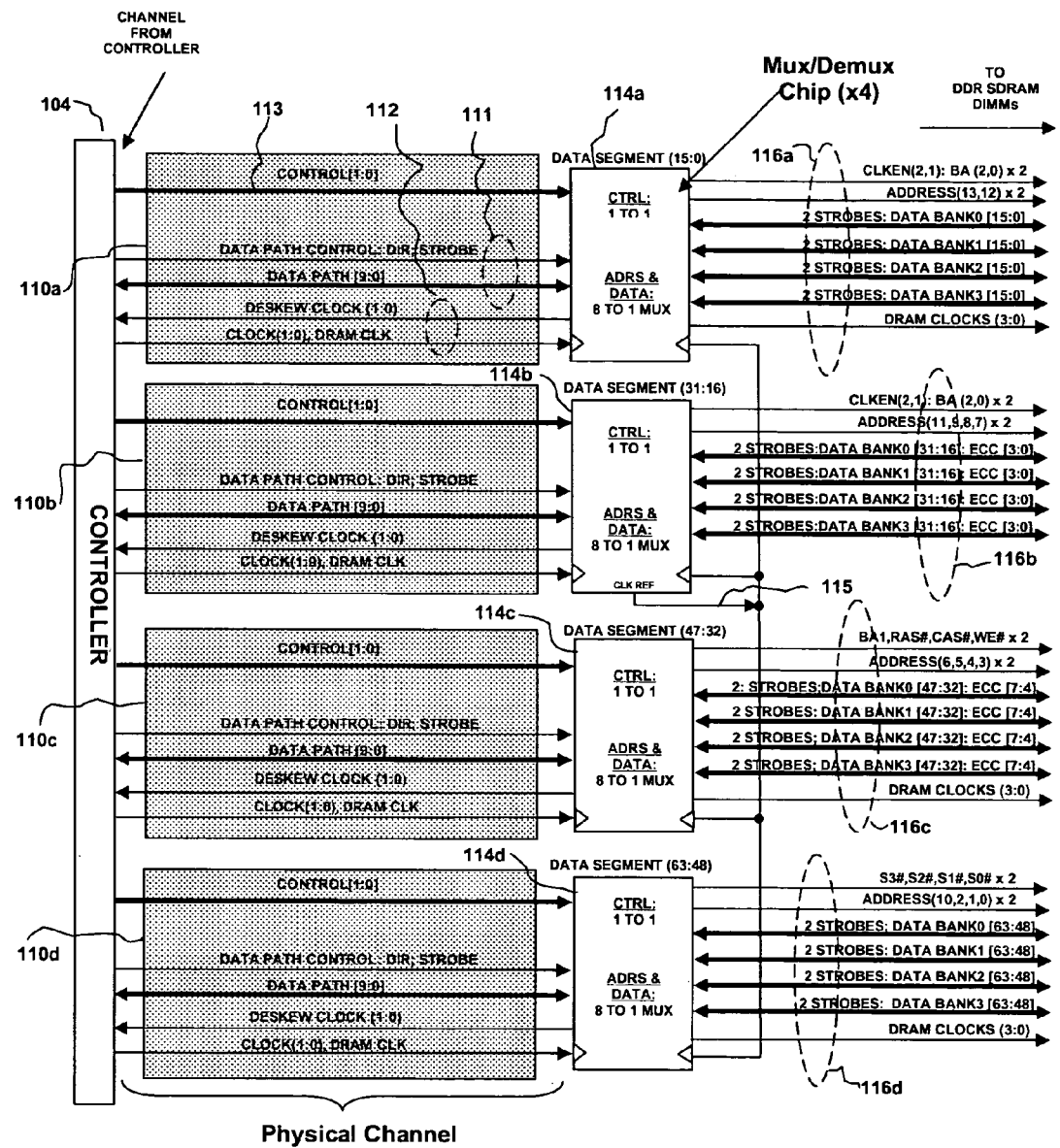
FIG. 11 illustrates a channel and memory signals.

FIG. 11 illustrates further detail of an embodiment of the invention presented in FIG. 9. In FIG. 11, the mux/demux blocks 114*a*, 114*b*, 114*c*, 114*d* which service the DIMMs are shown to be constructed of single semiconductors (i.e., discrete chips or integrated circuit devices). Each mux/demux block 114 interfaces to both the high-speed point-to-point signals 111, 112, 113 and the signal sets which correspond to conventional double data rate (SDR) signals 116*a*, 116*b*, 116*c*, 116*d*. Single data rate signals or quad or higher data rate signals may be used in alternative implementations. For the embodiment shown, up to 4 DIMs may be installed, with each DIMM providing 800 Megabytes of bandwidth. Since each DIMM's data is being handled in four different 16-bit slices (114*a* for 15–0, 114*b* for 31–16, etc . . . ), and each slice accumulates data from four different banks of DIMMs, the total bandwidth required for a single mux/demux block 114 is: 800 Megabytes-per-second/2 bytes-per slice=400 Megabytes per slice per DIMM. However, with four DIMM's worth of bandwidth required, the total amount of bandwidth required is 400 Megabytes per slice per DIMM×4 DIMM=1.6 Gigabytes/second per slice. As provided for in the present invention, it is possible to have the high-speed point-to-point channel 110*a*, 110*b*, 110*c*, 110*d* run faster than the signal connections going to the DIMMs 116. In this embodiment, a transfer speed of 3.2 Gigabyte/second is utilized for each high-speed point-to-point channel 110*a*, 110*b*, 110*c*, 110*d*. The selection of 3.2 Gigabyte/second sets the multiplexing/demultiplexing rate at 8-to-1 within each mux/demux block 114. This selection of throughput for the high-speed point-to-point channel 110 is arbitrary and can be selected to meet design and cost goals. For example, to reduce the number of signals required for the high-speed point-to-point channel, a higher target throughput rate can be selected. Similarly, the selection and design of the signal set for the high-speed point-to-point channel 110 can be achieved through various means. However, one aspect of the present invention is the inclusion of clocking signals that are separate and distinct from other signals (data or control) and provide for the simple recovery of data into mux/demux circuits without the need for sophisticated and expensive Clock-Data Recovery (CDR) elements. FIG. 20 presents an exemplary list of signals for the high-speed point-to-point channel 110 of FIG. 11. The signal type (input or output), differential or single-ended status ("S or D"), and pin quantity is listed for each signal. Different signal type, differential status and pin quantity may be used for any or all of the signals in alternative embodiments. As shown, channel data is carried on a 10 bit bus with its associated control signals 111 (DATA, DIRECTION, STROBE). The DATA signals are bi-directional. The CON- TROL BUS, comprised of two signal lines, carries information about the type of transaction (read, write, etc . . . ) on the high-speed point-to-point channel 110 and is not time multiplexed. The remaining group of signals 112 include a two phase channel clock (CLK), a single phase clock at the frequency of the DIMM clock period (DRAM CLK) and a reverse direction two-phase de-skew clock for capturing data in the memory controller 104 during read operations.

Figure 15:
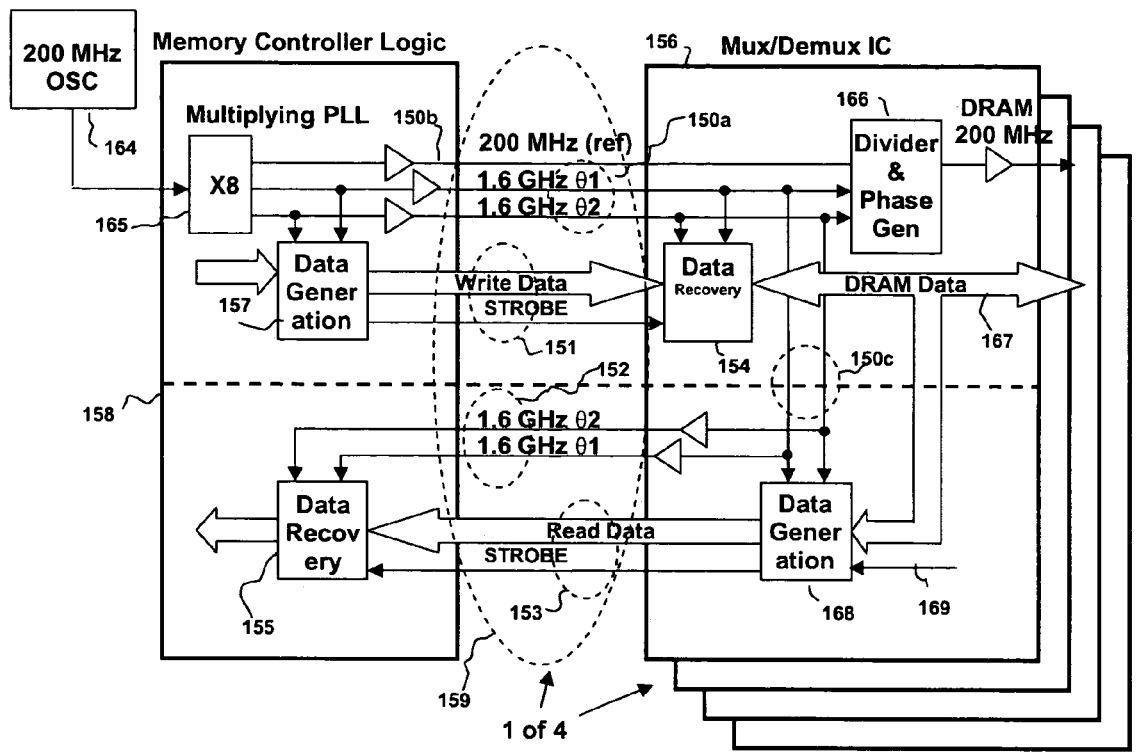
FIG. 15 illustrates an embodiment of the invention which utilized simplified clocking.
Figure 16:
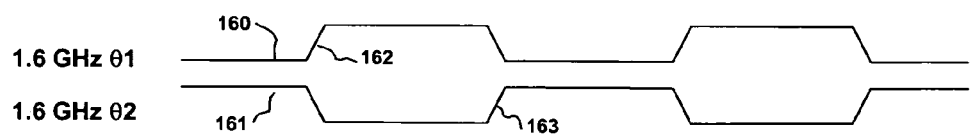
FIG. 16 illustrates a two phase clock.

FIG. 15 illustrates a block diagram for an embodiment of a two-phase clock data transmission scheme for the high speed point-to-point channel 159. A reference clock source 164 creates a timing base of 200 MHz for the DRAMs used in this embodiment. The reference clock drives a multiplying phase locked loop (PLL) 165 within the memory controller 158. The output of the multiplying PLL are a 200 MHz reference clock 150b and two 1.6 GHz clocks 150a which are 180 degrees out of phase from each other. The timing diagram of these clocks is illustrated in FIG. 16. The 200 MHz reference clock 150b in combination with the two 1.6 GHz clocks 150a comprise the write clocking signal set for the high-speed point-to-point channel 159. The high speed forward clocking signal set 150a, 150b is received within the Mux/Demux IC 156 by the divider & phase generator 166 in addition to the data recovery circuit 154. Write data (from the memory controller 158 to the mux/demux IC 156) is generated by the memory controller data generation block 157 which is driven by the un-buffered internal version of the high speed write clocking set 150a, 150b. The Write Data path 51 and the Read Data path 153 are illustrated as separate but may be implemented as a single bi-directional bus. Write data generated by block 157 is transmitted over the high-speed point-to-point signal lines to the mux/demux IC 156 with an accompanying strobe signal which is used by the data recovery circuit 154 to enable the capture of data. Write data captured in the data recover circuit 154 is forwarded to external memory elements (not shown) via the DRAM Data bus 167. Read data from DRAMs is captured in mux/demux IC data generation circuit 168 by an enable signal 169 generated from control circuitry within the mux/demux IC. The mux/demux IC generation circuit 168 utilizes a phase delayed clocking signal set version 150c (due to signal distribution) as the same high speed forward clocking signal set 150a as provided for the write data. Read data from the DRAM is transmitted to the memory controller 158 in synchrony with a buffered version of the high speed forward clocking signal set 152. The read data is captured in the memory controller 158 by the data recovery circuit 155 which utilizes the synchronized clock set 152. A major benefit to this method of clocking, for both the forward and reverse direction, is described as follows. Using a two-phase clock, at 180 degrees difference, means there are two rising clock edge signals per clock period available to capture data. Therefore two 1.6 GHz clocks, set at 180 degrees apart in phase effectively is capable of clocking data at a 3.2 GHz rate. By sending both the data and clock signals simultaneously and down the same channel, it is straightforward to use simple circuit structures to capture transmitted data. A very simple embodiment is to use D type flip-flops (i.e., no phase-locked loop (PLL) or delay-locked loop (DLL) is required). This approach can be contrasted to a method wherein the phase relationship between the clock and data is variable or not stable and therefore requires the assistance of a PLL or DLL. Alternatively, a slightly improved version of the data recovery logic might include methods for eliminating moderate signal skew differences.

Figure 14A:
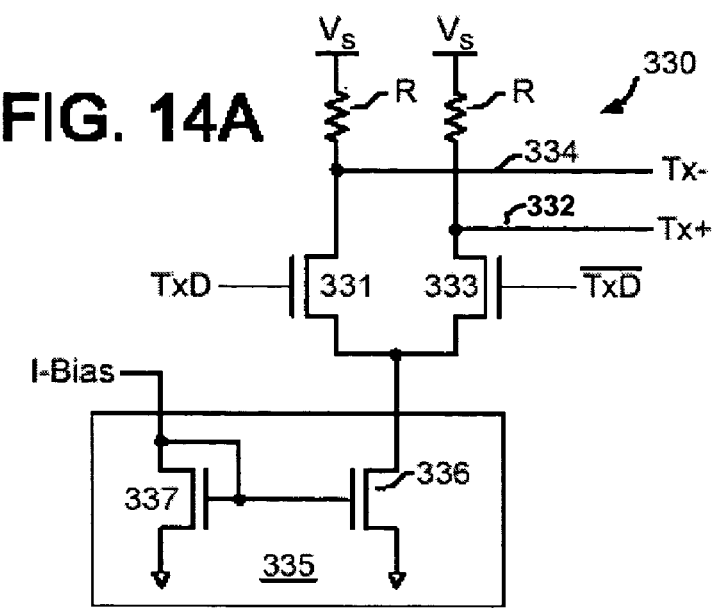
FIG. 14A illustrates an embodiment of a current mode logic driver that may be used to implement the differential output drivers in embodiments of the invention.
Figure 14B:
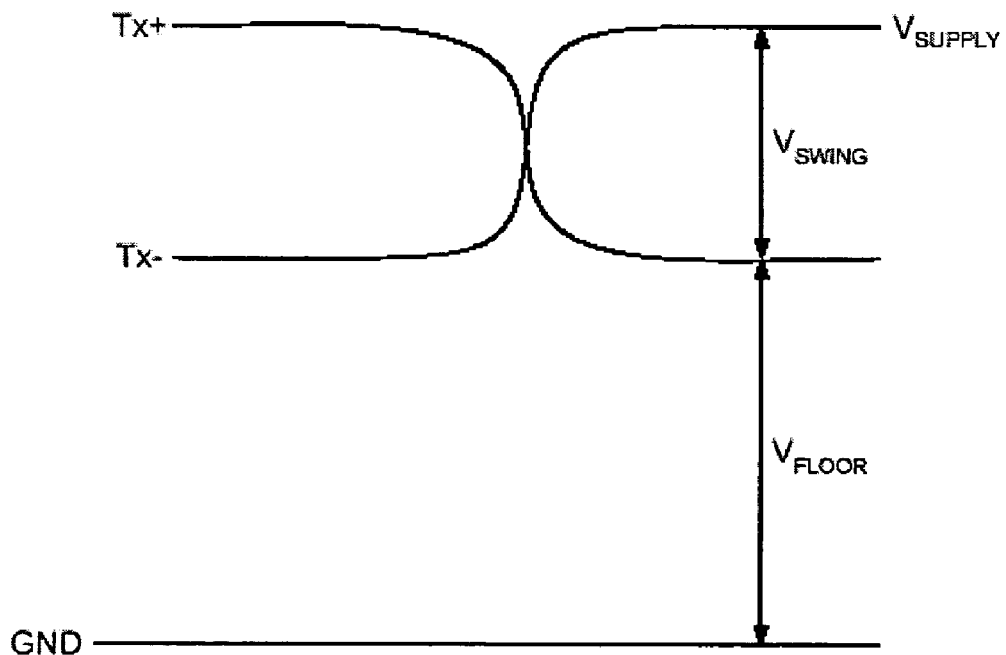
FIG. 14B illustrates an exemplary output signal waveform generated by the current mode logic driver of FIG. 14A.

In the embodiment of FIG. 15, all of the signals transmitted on the high-speed point-to-point channel are differential signals generated by current mode logic (CML) differential output drivers. FIG. 14A, for example, illustrates a CML driver 330 that may be used to implement such differential output drivers. The CML driver 330 includes transistors 331 and 333 having drains coupled to respective termination elements (depicted as resistors, R, in FIG. 14A, though active load elements may be used) and that form differential output nodes 332 (Tx+) and 334 (Tx−). The source terminals of transistors 331 and 333 are coupled to one another and to a biasing circuit 335 that controls the current drawn through the termination elements, and therefore the voltage swing generated at the differential output nodes 332 and 334. In the embodiment of FIG. 14A, the biasing circuit 335 includes a biasing transistor 336 coupled in a current-mirror configuration with a diode-configured transistor 337. By adjusting the voltage at the drain of the diode-configured transistor 337 (a control signal designated "I-Bias" in FIG. 14A), the current through transistor 337 may be increased or decreased to achieve a desired, proportional increase or decrease in the bias current drawn by biasing transistor 336, and thereby calibrate the signal swing of the CML driver 330 to a desired amplitude. FIG. 14B illustrates an exemplary output signal waveform generated by the CML driver 330 of FIG. 14A. When a logic '1' value is to be transmitted, the transmit data value (TxD) and complement transmit data value (/TxD) applied to the gates of transistors 331 and 333, are '1' and '0', respectively. Consequently, transistor 331 is switched on to conduct most or all of the bias current established by the biasing circuit 335 and therefore pulls output node 334 down according to the voltage drop across the corresponding termination element. At the same time, transistor 333 is switched off (or to a conduction state that conducts a smaller current than that conducted by transistor 331) so that output node Tx+ is pulled up to a level at or near the supply voltage, $V_S$. By this operation, a small-swing differential signal is generated at the output nodes 332 and 334 (and therefore on the outgoing differential signal line) with the amplitude of the swing being established by the bias current through transistor 336. In a specific embodiment, the supply voltage is approximately one volt, and the swing amplitude is 200 millivolts (e.g., established by a ~4 mA bias current drawn through a 50 ohm termination element). Thus, as shown in FIG. 14B, the low end of the signal swing occurs at voltage floor ($V_{FLOOR}$) 800 mV above a system ground reference. Different supply voltage levels, voltage swings and voltage floors may be used in alternative embodiments. Also, other types of output drivers may be used in alternative embodiments, including self-biasing output drivers, push-pull output drivers and so forth. One benefit achieved by using CML driver technology in embodiments of the invention is that the voltage swing of the signals on the high-speed point-to-point channel can be made to operate at very high speeds (multiples of Giga-Hertz) with relatively low voltage swings (~200 millivolts) and low power levels per signal line (~20 milli-Watt per differential pair). This saves power since a memory system implemented with full CDR (clock-data recovery) technologies on each memory element would consume considerably more power (~50 to 200 milliwatt per pair on a full CDR implementation).

Figure 13:
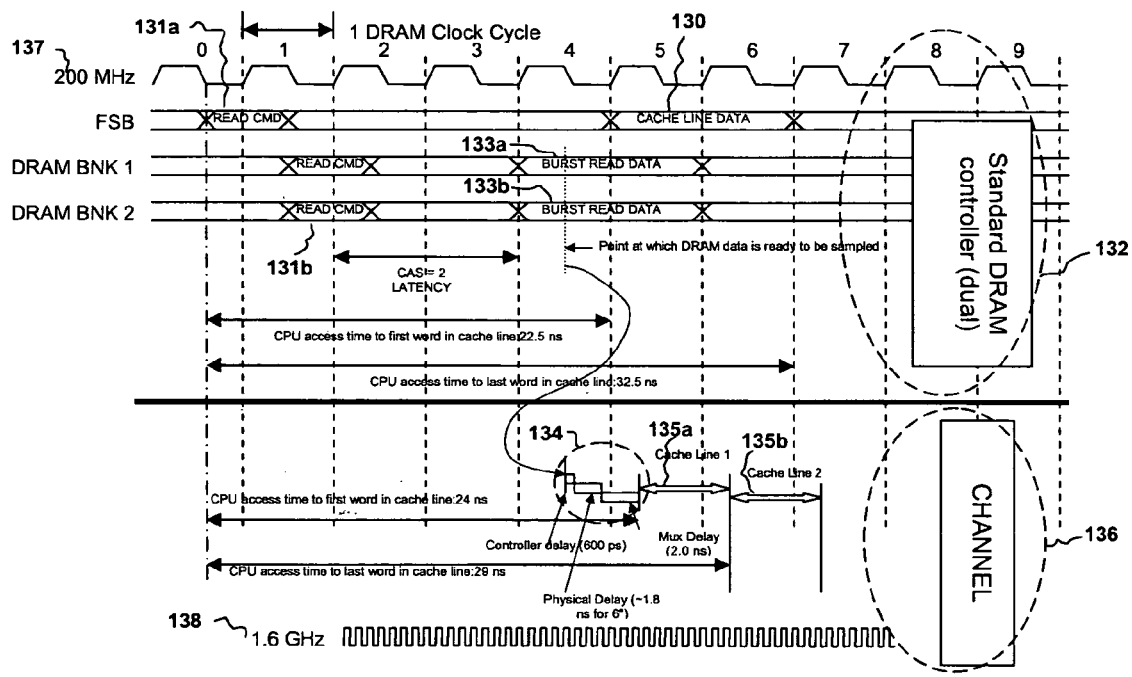
FIG. 13 illustrates memory read access latency considerations.

FIG. 13 illustrates a comparison timing diagram for an embodiment of the invention illustrated in FIG. 9. In the top half of the illustration, the timing for a read access for a dual memory controller is exhibited. A read transaction starts from a CPU issuing a READ CMD 131a on a front side bus (FSB). Taking into account the internal delay of the memory controllers, the READ CMD 131*b* is presented to DRAM banks 1 and 2 after a single 200 MHz clock cycle has elapsed. Assuming that the requested data is within the currently selected row, after two additional 200 MHz clock cycles, read burst data is available 133*a*, 133*b*. After one more 200 MHz clock elapses, the read data 130, in the form of a cache line, is available on the FSB bus. In this example, the two memory controllers each return four, 8-byte data items (one cache line) to the CPU. In the bottom half 136 of FIG. 13, the timing diagrams exhibit the additional delay incurred to transmit read data back to the FSB through the high-speed point-to-point channel 92, 93 and its associated mux/demux logic. Within the windowed area 134, there are three delays associated with conveyance of data from the DIMMs to the FSB, The first is a delay engendered by the multiplexing electronics at both ends of the high-speed point-to-point channel. This design and delay of these circuits depend on many factors but may reasonably be estimated to be around 2.0 nanoseconds for 130 nanometer CMOS transistors. Next, a physical transmission delay of approximately 1.8 nanoseconds is calculated for a 6 inch channel (longer or shorter channels may be used in other embodiments of the invention). Finally, a small delay is incurred within the memory controller 97 (600 pS) for the first read data item to arrive at the FSB 21. With the addition of the high-speed point-to-point channel, it is apparent that the first data bytes delivered to the FSB 21 are delayed from the delivery of the first data bytes for the dual-memory configuration 132. However, because each of the four DIMMs included in part of the system shown in FIG. 9 can simultaneously access data, it is possible to burst sixteen, 8-byte data items to the FSB 21, delivering two cache lines 135*a*, 135*b* in about the same amount of time as the dual memory controller 132 delivers a single cache line.

FIGS. 17 through 20 illustrate embodiments of detailed logic blocks which may be used to construct the mux/demux block 114 illustrated in FIG. 11. The Figures are not intended to be interpreted as a complete design guides but rather to further understanding the present invention.

Figure 17:
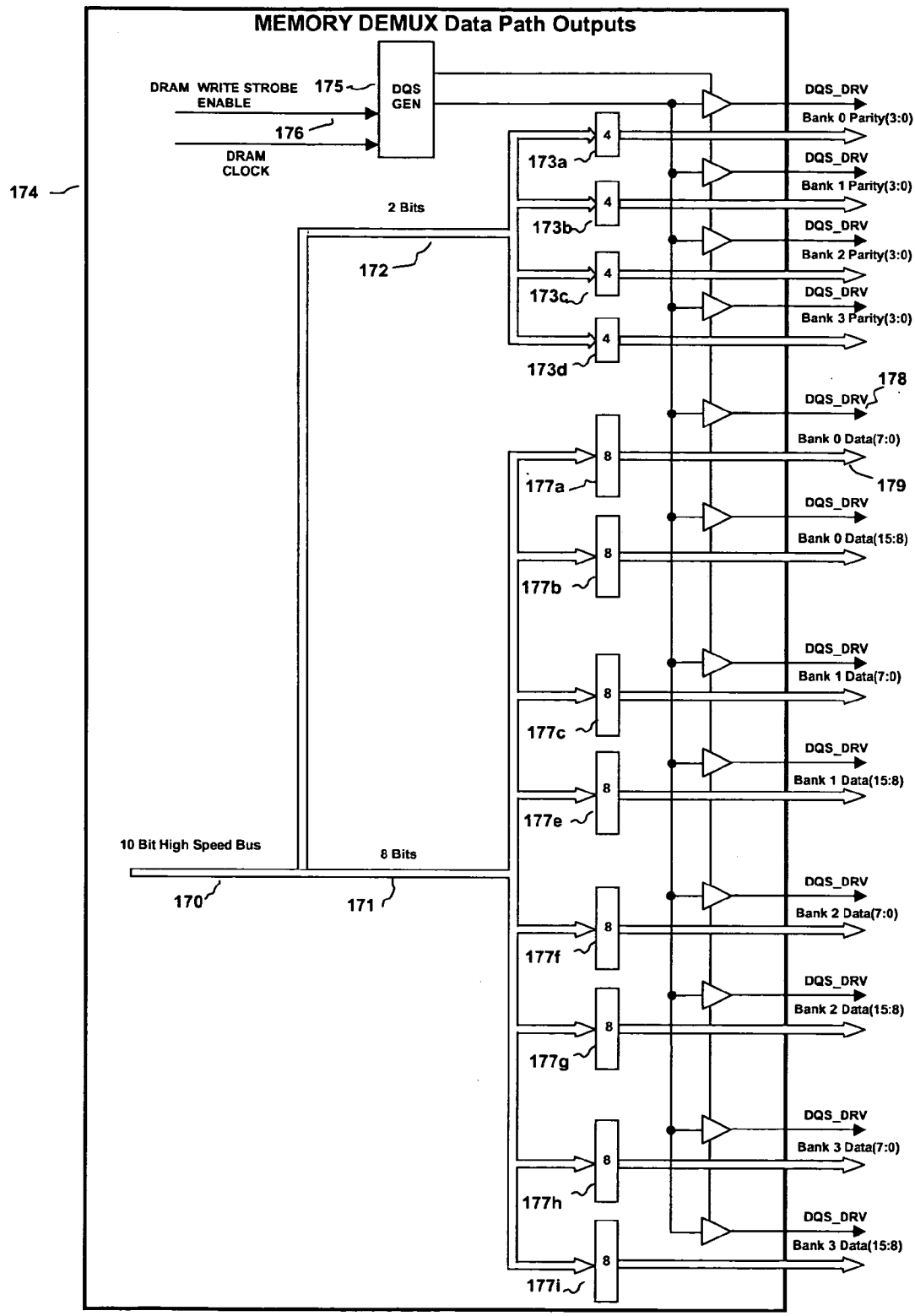
FIG. 17 illustrates an example of a memory data path write de-multiplexing logic.

FIG. 17 illustrates an example of a memory data path write de-multiplexing logic. A 10 bit high speed signal path 170, internal to the mux/demux chip 114 branches and provides data to both DRAM address and DRAM data latches 173, 177 respectively via signal busses 171 and 172. The data delivered on the 10 bit high speed bus is provided from the data recovery logic coupled into the high-speed point-to-point channel 110. Control signals (not shown) are supplied to the data latches 173, 177 to cause data to be latched. Each latch, (177*a*, 177*b*, etc . . . ) receives a time slot enable signal from elsewhere in the mux/demux chip 114, ensuring that latches only receive their target data. The parity latches 173*a*, 173*b*, 173*c*, 173*d* load sequentially at the same time the write data latches 177 are loaded. Once all latches are loaded (eight clock cycles), the stored data is available for strobing into DIMM DRAMS via DQS_DRV signals 178 which are generated by the DQS signal generator 175 and controlled from the controller via signal line 176. The naming nomenclature of signals connected to the DIMM DRAMS is dependent upon which "slice" the particular mux/demux chip 114 is servicing. In FIG. 17 the nomenclature denotes a use for the first two byte lanes. To be used in the second two byte lanes 114*b*, the data buses would be denoted as "Bank 1 Data (31:16)" and so on and so forth.

Figure 18:
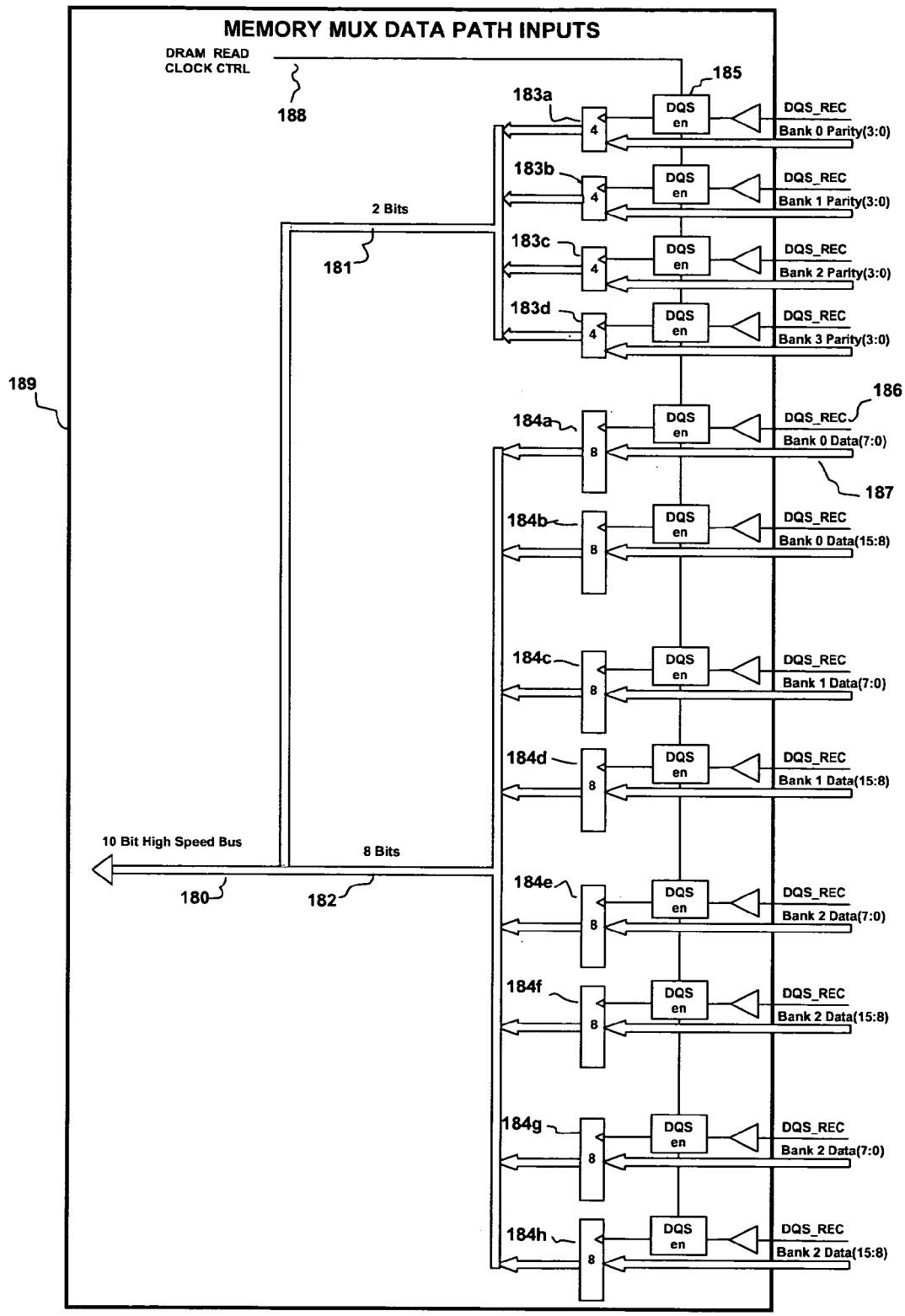
FIG. 18 illustrates an example of a memory data path read multiplexing logic.

FIG. 18 illustrates an example of a memory data path read multiplexing logic. Latches for read data 184*a*, 184*b*, etc . . . capture data from DIMM DRAMS simultaneously via the DQS (data strobe signal) supplied by the DRAMs. Similarly, latches 183*a*, 183*b*, etc . . . capture parity check bits from the DIMM DRAMS. At the time, the high-speed point-to-point channel 110 is ready to propagate read data to the memory controller 104. Internal enables on each latch 184, 183 (enables not shown), sequentially drive the contents of each latch onto the 10 bit high speed bus 180, which is a combination of data busses 181, 182. The naming nomenclature of signals connected to the DIMM DRAMS is dependent upon which "slice" the particular mux/demux chip 114 is servicing. In FIG. 18, the nomenclature denotes a use for the first two byte lanes. To be used in the second two byte lanes 114*b*, the data buses would be denoted as "Bank 1 Data (31:16)" and so on and so forth.

Figure 19:
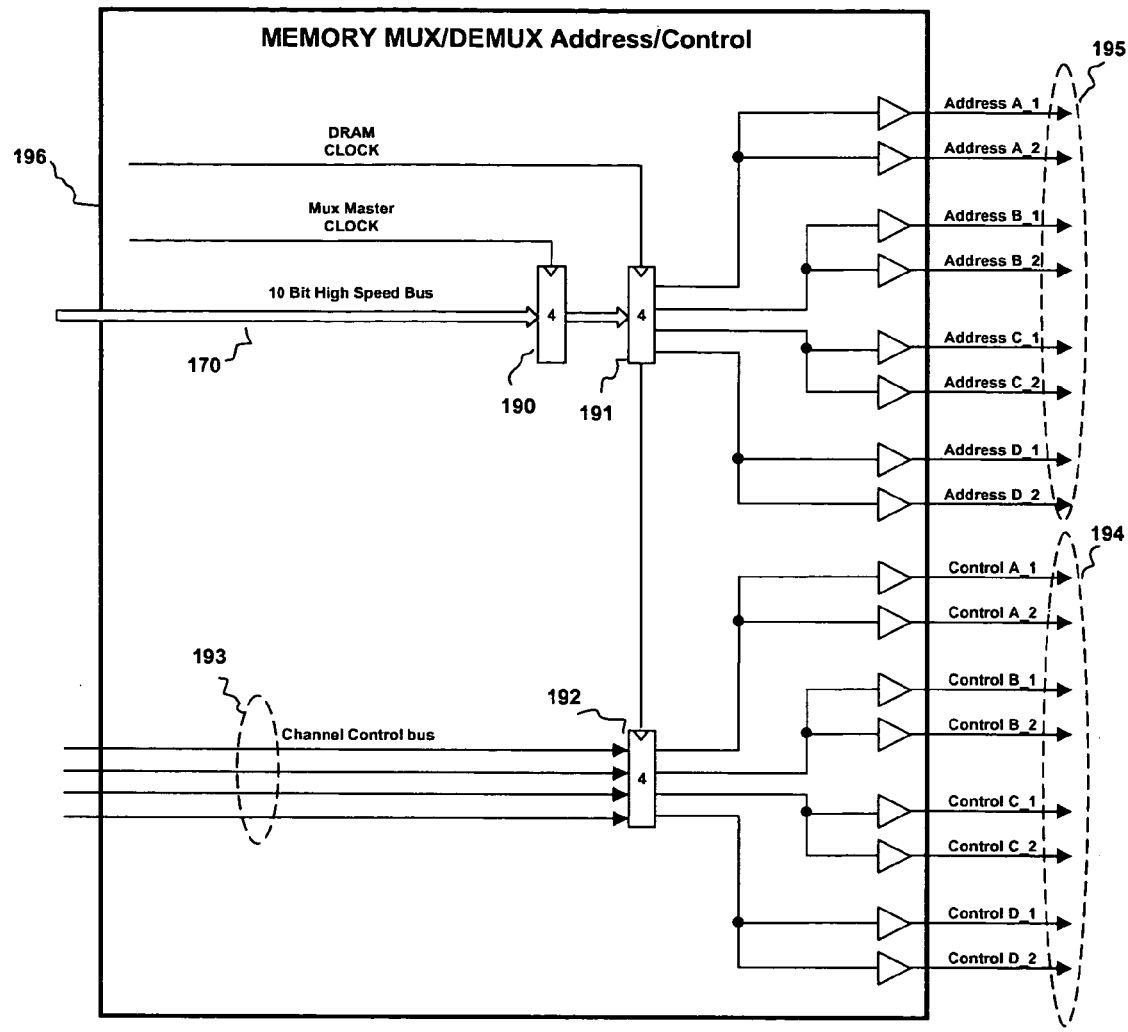
FIG. 19 illustrates an example of a memory address path de-multiplexing logic.

FIG. 19 illustrates an example of a memory address path de-multiplexing logic 196. The memory mux/demux address control consist of a master latch 190 for data path 170 controlled by a mux master clock. The output of the master latch is again re-latched at data latch 191 and control latch 192 using the DRAM clock. The output of the memory mux/demux address control signal 195 and 196 interface with the DDR, SDRAM DIMM modules. The 10 bit high speed bus 170 is not only used for DIMM DRAM write data but is also available for transmitting DIMM DRAM addresses. During the address delivery phase of a complete memory cycle, the address generated within the memory controller 104 is transmitted into an address data latch 191 within the mux/demux chip 114. An appropriate strobe signal used to enable the capture of address data into the address data latch by an internal signal generated elsewhere within the mux/demux chip 114 (FIG. 11). Control signals for the DIMM DRAM are not multiplexed and therefore do not need to be multiplexed. These control signals could be time domain multiplexed and treated like the address bits. The names of these control signals are not specified in FIG. 19 since both the address and control signals are dependent upon which slice the logic is utilized.

Figure 10:
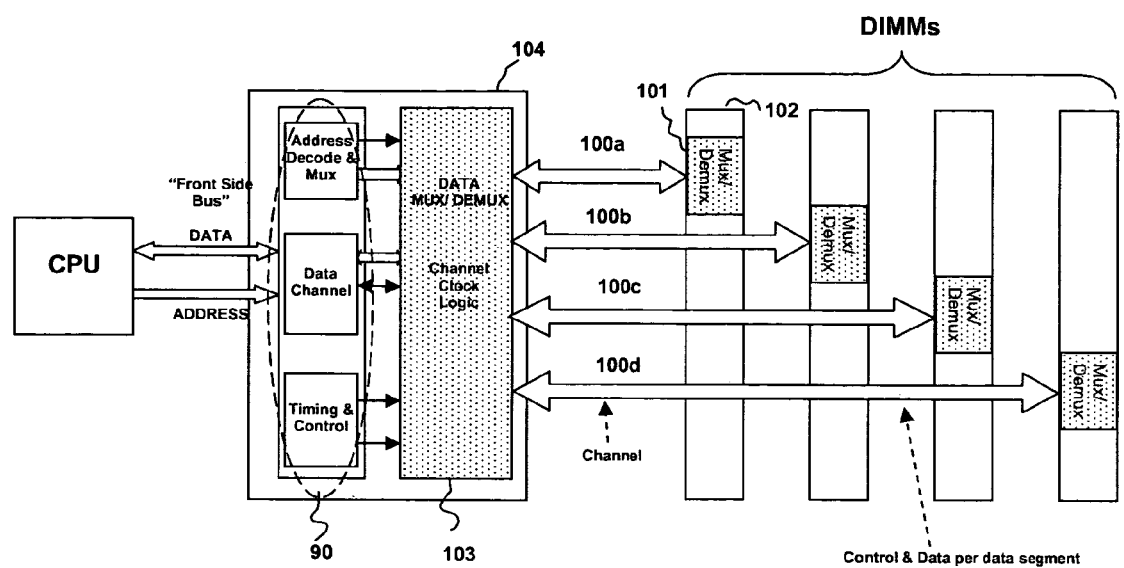
FIG. 10 illustrates an embodiment of the invention with memory controller with multiple high-speed point-to-point channels.

FIG. 10 illustrates an embodiment of the invention with memory controller 104 consisting of two functional elements. The circuitry required for control function 90 and the channel clock logic circuitry as well as data mux/demux interface circuitry 103 to serve the multiple high-speed point-to-point channels 100*a*–100*d*. Each channel emanating from 104 services only a single DIMM 102. The mux/demux logic 101 assigned to each DIMM handles only the address, read or write data for that DIMM 102. For example, if a single DIMM can supply 3.2 Gigabytes-per-second of data bandwidth, then the high-speed point-to-point channel 100*a*, 100*b*, 100*c*, 100*d* generally should be able to support the entire bandwidth. A key advantage to this implementation is the ability for the high-speed point-to-point channel to run significantly faster than 3.2 Gigabits per second per signal. With an eight bit implementation for the high-speed point-to-point channel 100, the bandwidth of the DIM matches the channel. By clocking the high-speed point-to-point channel at 12.8 Gigabits-per-second, the channel width need only be 2 bits (or 4 differential lines). With the addition of clocking signals and several control signals into the high-speed point-to-point interface 100, the total signal count, per DIMM, would be around 16 (differential) depending upon clocking and control signal encoding schemes.

Although the invention has been described with reference to specific exemplary embodiments thereof, it will be evident that various modifications and changes may be made thereto without departing from the broader spirit and scope of the invention. The specification and drawings are, accordingly, to be regarded in an illustrative rather than a restrictive sense.

What is claimed is:

1. A memory system comprising:
 a memory controller;
 an interface device coupled to the memory controller via a first signal path that is permanently terminated at the interface device; and
 a plurality of memory elements removably coupled to the interface device via respective second signal paths, each of the second signal paths having a lower data transfer capacity than a data transfer capacity of the first signal path.

2. The memory system of claim 1 wherein the first signal path comprises a plurality of substantially parallel signal lines that extend from a first end at the memory controller to a second end at the interface device.

3. The memory system of claim 2 wherein the plurality of the signal lines is disposed within a flexible material to form a flex cable.

4. The memory system of claim 2 wherein the plurality of signal lines comprise conductive traces disposed on a printed circuit board.

5. The memory system of claim 2 wherein the first signal path further comprises a plurality of shielding elements disposed adjacent individual signal lines of the plurality of signal lines to shield the individual signal lines from one another.

6. The memory system of claim 5 wherein each of the shielding elements is disposed in coaxial alignment with a respective one of the individual signal lines.

7. The memory system of claim 1 wherein the interface device is implemented in a dedicated integrated circuit device.

8. The memory system of claim 1 wherein the data transfer capacity of the first signal path is at least as great as a sum of the data transfer capacities of the second signal paths.

9. The memory system of claim 1 wherein the first signal path comprises at least one signal Line to conduct a first timing signal from the memory controller to the interface device, and wherein the interface device includes circuitry to sample signals on the first signal path in synchronism with the first timing signal.

10. The memory system of claim 9 wherein the first timing signal is a clock signal.

11. The memory system of claim 9 wherein the first timing signal is a strobe signal.

12. The memory system of claim 9 wherein the second signal paths comprise respective signal lines to conduct second timing signals from the interface device to the memory elements, and wherein the first timing signal oscillates at greater frequency than the second timing signals.

13. The memory system of claim 12 wherein the oscillating frequency of the first timing signal is an integer multiple of the oscillating frequency of the second timing signals.

14. The memory system of claim 1 wherein at least one of the memory elements comprises a memory module having a plurality of discrete memory devices mounted thereon.

15. The memory system of claim 1 wherein at least one of the memory elements comprises a plurality of memory modules coupled in parallel to the respective second signal path.

16. The memory system of claim 1 wherein at least one of the memory elements comprises a discrete semiconductor memory device.

17. An interface device for use in a memory system, the interface device comprising:
 a first input/output (I/O) port to receive multiplexed data from a memory controller at a first signaling rate via a signal path that is permanently terminated at the interface device;
 demultiplexing circuitry to demultiplex the multiplexed data into a plurality of data subsets; and
 a plurality of second I/O ports to output the plurality of data subsets to respective memory elements at a second signaling rate.

18. The interface device of claim 17 wherein the second signaling rate is slower than the first signaling rate.

19. The interface device of claim 18 wherein the first signaling rate is an integer multiple of the second signaling rate.

20. The interface device of claim 17 wherein the interface device is implemented in a dedicated integrated circuit device.

21. The interface device of claim 17 wherein the demultiplexing circuitry is configured to allocate multiplexed data received during a first time interval to a first one of the data subsets and to allocate multiplexed data received during a second time interval to another one of the data subsets.

22. A method of operation within a memory system, the method comprising:
 transmitting multiplexed data from a memory controller to an interface device at a first data rate via a signal path tat is permanently terminated at the interface device;
 demultiplexing the multiplexed data into a plurality of data subsets within the interface device; and
 transmitting the each of the data subsets from the interface device to a respective one of a plurality of memory elements at a second data rate.

23. The method of claim 22 wherein the second data rate is lower than the first data rate.

24. The method of claim 22 wherein the first data rate is an integer multiple of the second data rate.

25. The method of claim 22 further comprising receiving the multiplexed data within the memory controller.

26. The method of claim 22 further comprising receiving a plurality of data values from a host device, and wherein transmitting multiplexed data from the memory controller to the interface device comprises transmitting the plurality of data values to the interface device in respective time intervals.

27. The method of claim 22 wherein demultiplexing the multiplexed data into a plurality of data subsets comprises allocating multiplexed data received in the interface device during a first time interval to a first one of the data subsets and allocating multiplexed data received during a second time interval to a second one of the data subsets.

* * * * *